United States Patent
Kikuchi et al.

(10) Patent No.: US 12,312,485 B2
(45) Date of Patent: May 27, 2025

(54) INK JET INK COMPOSITION, RECORDING METHOD, AND RECORDED MATTER

(71) Applicant: SEIKO EPSON CORPORATION, Tokyo (JP)

(72) Inventors: Kenta Kikuchi, Suwa (JP); Hiroaki Kumeta, Matsumoto (JP); Satoshi Tsubamoto, Shiojiri (JP); Koji Imamura, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 168 days.

(21) Appl. No.: 18/117,499

(22) Filed: Mar. 6, 2023

(65) Prior Publication Data

US 2023/0279253 A1    Sep. 7, 2023

(30) Foreign Application Priority Data

Mar. 7, 2022  (JP) ................................ 2022-034793

(51) Int. Cl.
*C09D 11/38* (2014.01)
*C09D 11/326* (2014.01)

(52) U.S. Cl.
CPC ............ *C09D 11/38* (2013.01); *C09D 11/326* (2013.01)

(58) Field of Classification Search
CPC ..... C09D 11/322; C09D 11/38; C09D 11/326; C09D 11/324; C09D 11/08; C09D 11/328; C09D 11/30; C09D 11/36; C09D 11/17; C09D 11/033; B41M 5/0023; B41J 2/01; B41J 2/2107; B41J 2/2114
See application file for complete search history.

(56) References Cited

U.S. PATENT DOCUMENTS

2017/0015852 A1    1/2017    Benohoud et al.

FOREIGN PATENT DOCUMENTS

JP    2017-008275 A    1/2017

*Primary Examiner* — Jannelle M Lebron
(74) *Attorney, Agent, or Firm* — Harness, Dickey & Pierce, P.L.C.

(57) ABSTRACT

An ink jet ink composition is a water-based ink jet ink composition and includes a vegetable black-derived colorant, a lignosulfonate salt, and an element A which includes at least one selected from the group consisting of Ca, Mg, Mn, Fe, Al, Si, Cr, Ni, Sr, and Ba, and a content of the element A with respect to a total mass of the ink composition is 50 to 1,700 mass ppm.

11 Claims, 1 Drawing Sheet

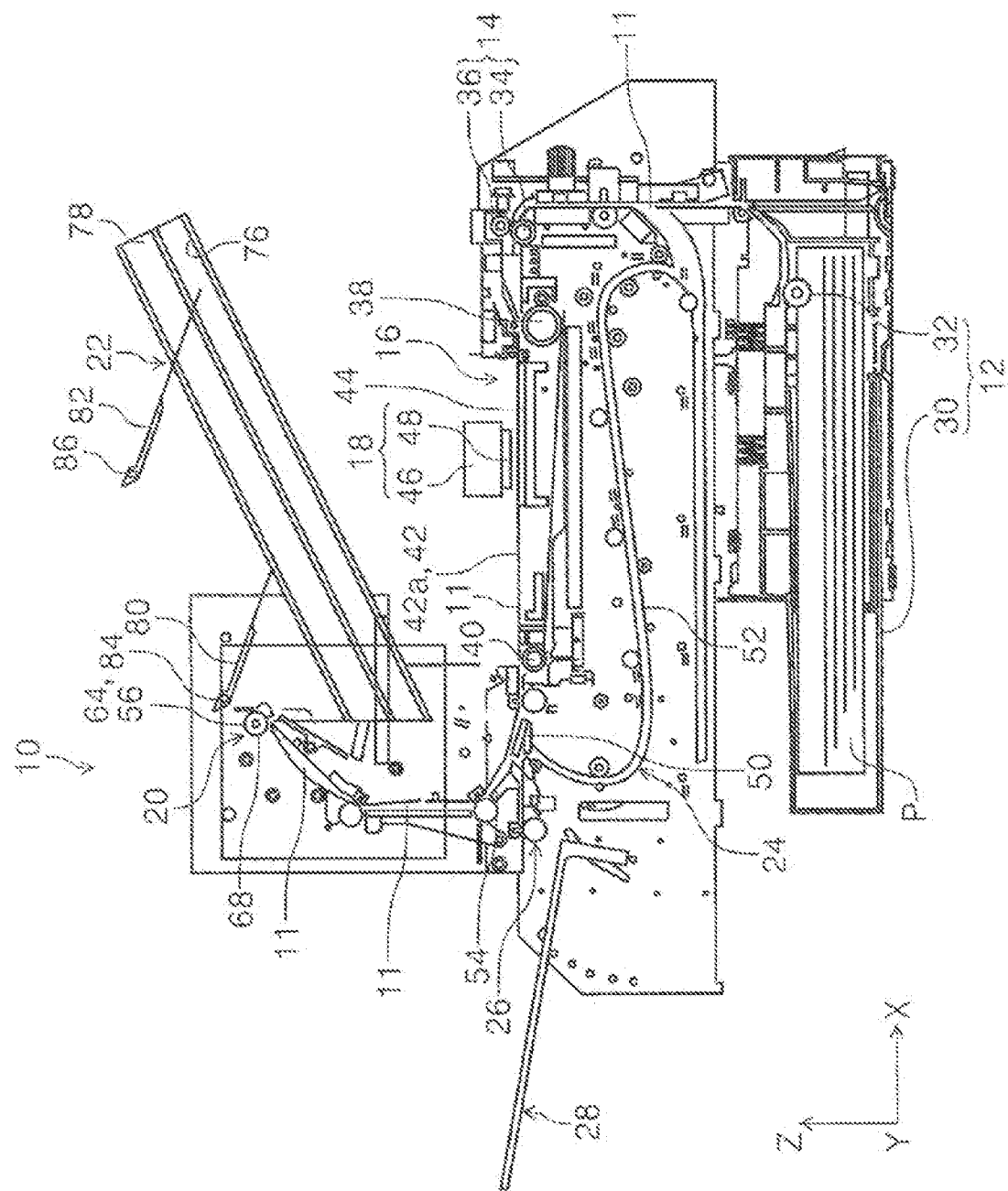

INK JET INK COMPOSITION, RECORDING METHOD, AND RECORDED MATTER

The present application is based on, and claims priority from JP Application Serial Number 2022-034793, filed Mar. 7, 2022, the disclosure of which is hereby incorporated by reference herein in its entirety.

BACKGROUND

1. Technical Field

The present disclosure relates to an ink jet ink composition, a recording method, and a recorded matter.

2. Related Art

Since being able to record a highly fine image by a relatively simple apparatus, an ink jet recording method has been rapidly developed in various fields. In particular, in recent years, environmental problems have been concerned, and in consideration of the above environmental problems, development of ink using naturally-derived materials has been carried out. As the ink using naturally-derived materials as described above, for example, in order to provide a highly safe edible ink jet ink, for example, JP-A-2017-008275 has disclosed an ink jet ink containing water, sodium iron chlorophyllin and/or sodium copper chlorophyllin, and a vegetable carbon black.

A nozzle plate of an ink jet head originally has a preferable water-repellent property, and hence, an ink composition to be ejected from a nozzle is configured not to be easily adhered to a nozzle periphery. However, as disclosed in JP-A-2017-008275, an ink composition using a vegetable black has a high sedimentation property because of its large particle diameter, and as a result, degradation in ejection stability has been concerned.

SUMMARY

According to an aspect of the present disclosure, there is provided an ink jet ink composition which is a water-based ink composition and which contains a vegetable black-derived colorant, a lignosulfonate salt, and an element A which includes at least one selected from the group consisting of Ca, Mg, Mn, Fe, Al, Si, Cr, Ni, Sr, and Ba, and a content of the element A with respect to a total mass of the ink composition is 50 to 1,700 mass ppm.

According to another aspect of the present disclosure, there is provided a recording method comprising a step of ejecting the ink jet ink composition described above from an ink jet head so as to be adhered to a recording medium.

According to another aspect of the present disclosure, there is provided a recorded matter obtained by adhering the ink jet ink composition described above to a recording medium.

BRIEF DESCRIPTION OF THE DRAWING

FIGURE is a view showing one example of a recording apparatus to be used for a recording method of this embodiment.

DESCRIPTION OF EXEMPLARY EMBODIMENTS

Hereinafter, although an embodiment (hereinafter, referred to as "this embodiment") of the present disclosure will be described in detail, if needed, with reference to the drawing, the present disclosure is not limited thereto and may be variously changed and/or modified without departing from the scope thereof. In addition, in the drawing, the same element is designated by the same reference numeral, and duplicated description will be omitted. In addition, unless otherwise particularly noted, the positional relationship, such as up to down and/or right to left, is based on the positional relationship shown in the drawing. Furthermore, the dimensional ratio in the drawing is not limited to that shown therein.

1. Ink Jet Ink Composition

An ink jet ink composition (hereinafter, simply referred to as "ink composition" in some cases) according to this embodiment is a water-based ink composition and contains a vegetable black-derived colorant, a lignosulfonate salt, and an element A which includes at least one selected from the group consisting of Ca, Mg, Mn, Fe, Al, Si, Cr, Ni, Sr, and Ba, and a content of the element A with respect to a total mass of the ink composition is 50 to 1,700 mass ppm.

In recent years, in consideration of the environmental problems, as a naturally-derived colorant to be used for ink, a black ink using a pigment formed from a vegetable black, such as bamboo charcoal or wood charcoal, has been studied. Heretofore, although a carbon black which is one of pigments derived from petroleum contains a small amount of metal as impurities, a vegetable-derived colorant is characterized in that a large amount of metal is contained. Since this metal is eluted into an ink, a network structure in which molecules are bonded to each other in various directions is liable to be formed using the metal thus eluted as a starting point of the network. As a result, it becomes understood that in the ink containing a vegetable black-derived colorant, problems may occur in a manner such that the viscosity is increased with time and, in addition, the ejection stability is degraded.

Accordingly, through intensive research carried by the present inventors, it was found that a dispersion stability of a vegetable black-derived colorant is further improved by a lignosulfonate salt, and as a result, a storage stability and a printing stability are further improved. Although the reason for this is not particularly limited, the present inventors consider that the vegetable black-derived metal and the lignosulfonate salt form a chelate, and this chelate is stably present on the surface of the vegetable black-derived colorant.

Hereinafter, components, physical properties, and a manufacturing method of the ink composition according to this embodiment will be described.

1.1. Colorant

The ink composition contains as the colorant, a vegetable black-derived colorant and may further contain at least one colorant other than that described above. The colorant may be used alone, or at least two types thereof may be used in combination.

1.1.1. Vegetable Black-Derived Colorant

The ink composition of this embodiment contains a vegetable black-derived colorant. The vegetable black-derived colorant is not particularly limited, and for example, there may be used Binchotan charcoal, bamboo charcoal, active carbon, white charcoal, black charcoal, extruded charcoal, sawdust charcoal, plum charcoal, oak charcoal, rice pine charcoal, seaweed charcoal, mangrove charcoal, or palm shell charcoal. In order to further improve the storage stability of the ink composition, as the vegetable black, at least one of Binchotan charcoal and bamboo charcoal is preferable.

In this specification, the "vegetable black-derived colorant" may be a carbonized colorant which is obtained by treating vegetables under a high-temperature condition. In addition, the "high-temperature conditions" is not particularly limited as long as vegetables can be carbonized, and for example, there may be used a high-temperature condition at a temperature of 250° C. or more which is known as "charcoal making" under which vegetables, such as bamboo or wood, can be turned into ashes, a high-temperature condition at a temperature of 350° C. or more under which non-carbonized components are to disappear, or a high-temperature condition at a temperature of 700° C. or more which can be realized using a charcoal kiln or the like.

A content of the vegetable black-derived colorant is not particularly limited and is, for example, 1.0 to 30 percent by mass with respect to the total mass of the ink composition. In order to further improve the storage stability of the ink composition, the content of the vegetable black-derived colorant with respect to the total mass of the ink composition is preferably 2.0 to 20 percent by mass, more preferably 3.0 to 15 percent by mass, and further preferably 4.0 to 10 percent by mass.

A volume average particle diameter D50 of the vegetable black-derived colorant at a cumulative value of 50% is not particularly limited and is, for example, 30 to 500 nm. In order to suppress a decrease in sedimentation resistance of the ink composition and to improve the storage stability thereof, the volume average particle diameter D50 of the vegetable black-derived colorant is preferably 50 to 450 nm, more preferably 80 to 400 nm, even more preferably 100 to 300 nm, and further preferably 120 to 200 nm.

A particle diameter D90 (hereinafter, simply referred to as "particle diameter D90") obtained when an integrated value from a small particle diameter reaches 90% of the total in a cumulative distribution of volume-based particle diameters of the vegetable black-derived colorant is not particularly limited and is, for example, 50 to 1,200 nm. In order to improve the storage stability of the ink composition, the particle diameter D90 is preferably 80 to 1,000 nm, more preferably 90 to 800 nm, even more preferably 100 to 600 nm, and further preferably 120 to 500 nm.

A ratio (D90/D50) of the particle diameter D90 to the volume average particle diameter D50 is not particularly limited and is, for example, 1.1 to 5.0. In order to improve the storage stability of the ink composition, the ratio described above is preferably 1.2 to 4.5, more preferably 1.2 to 4.0, even more preferably 1.3 to 3.5, and further preferably 1.3 to 3.0.

The volume average particle diameter of this embodiment may be measured by a particle size distribution measurement device using a dynamic light scattering method as a measurement principle. In addition, the volume average particle diameter may also be measured by a particle size distribution measurement device using a dynamic and electrophoretic light scattering method as a measurement principle. As the particle size distribution measurement device as described above, for example, there may be mentioned "ELSZ-2000ZS" (trade name, manufactured by Otsuka Electronics Co., Ltd.) using a homodyne optical system as a frequency analysis method. In addition, in this embodiment, the average particle diameter of the vegetable black-derived colorant may be measured by measuring the average particle diameter of the ink composition.

1.1.1.1. Metal Element

Since containing the vegetable black-derived colorant, the ink composition contains an element A which includes at least one selected from the group consisting of Ca, Mg, Mn, Fe, Al, Si, Cr, Ni, Sr, and Ba. As the type of the element contained in the ink composition is not particularly limited, and besides the element A, for example, K, P, S, and/or the like may also be contained. In addition, the element A contained in the ink composition may be an element derived from the vegetable black or may also be an element which is added in a step of preparing the ink composition.

In addition, the metal element may exist in the form of a metal compound, a metal ion, or a metal itself. Among those mentioned above, the metal element preferably exists in the form of a water-soluble metal salt or a metal ion.

A content of the element A with respect to the total mass of the ink composition is 50 to 1,700 mass ppm. Since the content of the element A is in the range described above, the storage stability of the ink composition and/or the ejection stability thereof in recording are made excellent. From the same point as described above, the content of the element A with respect to the total mass of the ink composition is preferably 80 to 1,620 mass ppm, more preferably 100 to 1,500 mass ppm, even more preferably 140 to 1,400 mass ppm, and further preferably 200 to 1,300 mass ppm.

In the element A of the ink composition, a total content of Ca, Mg, Sr, and Ba with respect to the total mass of the ink composition is preferably 50 to 1,500 mass ppm. Since the total content of Ca, Mg, Sr, and Ba is in the range described above, the storage stability of the ink composition tends to be further improved. From the same point as described above, the total content of Ca, Mg, Sr, and Ba with respect to the total mass of the ink composition is more preferably 100 to 1,420 mass ppm, even more preferably 200 to 1,350 mass ppm, and further preferably 300 to 1,200 mass ppm.

In the element A of the ink composition, a total content of Fe, Cr, and Ni with respect to the total mass of the ink composition is preferably 10 to 500 mass ppm. Since the total content of Fe, Cr, and Ni is in the range described above, the storage stability of the ink composition tends to be further improved. From the same point as described above, the total content of Fe, Cr, and Ni with respect to the total mass of the ink composition is more preferably 30 to 400 mass ppm, even more preferably 50 to 320 mass ppm, and further preferably 70 to 300 mass ppm.

In the element A of the ink composition, a total content of Al and Si with respect to the total mass of the ink composition is preferably 0 to 250 mass ppm. Since the total content of Al and Si is in the range described above, the storage stability of the ink composition tends to be further improved. From the same point as described above, the total content of Al and Si with respect to the total mass of the ink composition is more preferably 150 mass ppm or less, even more preferably 100 mass ppm or less, and further preferably 50 mass ppm or less. A lower limit of the total content of Al and Si is not particularly limited, and for example, the lower limit may be set to 0 mass ppm or 10 mass ppm.

A method to measure the mass of the metal element contained in the ink composition is not particularly limited, and for example, an inductively-coupled plasma optical emission spectroscopy (ICP-OES) or an inductively-coupled plasma mass spectrometry (ICP-MS) may be mentioned. In the ink composition of this embodiment, an inductively-coupled plasma optical emission spectroscopy (ICP-OES) is preferable.

1.1.1.2. Purification of Vegetable Black-Derived Colorant

Since metal (mineral) components essential for the growth of vegetables are contained therein, in the vegetable black-derived colorant, various types of metal components are also contained. Hence, as the vegetable black-derived colorant contained in the ink composition, a colorant purified in a purification step may also be used. By the purification step, the element A contained in the ink composition can be controlled in a predetermined range.

A method to purify the vegetable black-derived colorant is not particularly limited as long as being capable of controlling the amounts of the metal components in the vegetable black-derived colorant. For example, one embodiment thereof will be described.

To 100 g of a vegetable black, approximately 0.6 g of sodium hydroxide, approximately 3.0 g of a chelating agent (such as disodium ethylenediaminetetraacetate), and water as the balance are added so that the total amount is set to approximately 700 g. The solution thus obtained is heated to approximately 90° C. for approximately 4 hours with stirring. After the temperature of the solution is cooled to ordinary temperature, a centrifugal separation is performed, so that the vegetable black is recovered. After this vegetable black is charged in pure water and then stirred, a centrifugal separation is further performed, and the operation as described above is repeatedly performed. A finally recovered material is dried by a drier, so that a purified vegetable black is obtained.

In addition, for example, when the type of reagent, the mass ratio thereof, the heating temperature, and the heating time described above are controlled, the amounts of the metal components in the purified vegetable black-derived colorant can be appropriately controlled.

1.1.2. Other Colorants

The ink composition may also contain at least one colorant other than the vegetable black-derived colorant. That is, a colorant derived from vegetables other than a vegetable black, an animal-derived colorant, a synthetic colorant, and the like are also allowed to be contained. As the colorant derived from vegetables other than a vegetable black, for example, there may be mentioned an anthocyanin-based pigment, a carotenoid-based pigment, a quinone-based pigment, a flavonoid-based pigment, or a betaine-based pigment. In addition, as the animal-derived colorant, for example, a squid ink (sepia), cochineal, or Tyrian purple may be mentioned. Furthermore, as the synthetic colorant, for example, there may be mentioned isoindolinone, diketopyrrolopyrrole, quinacridone, dioxazine, or phthalocyanine. In consideration of the environmental problems, as the colorant other than the vegetable black-derived colorant, the ink composition preferably contains a vegetable-derived colorant or an animal-derived colorant and more preferably contains a vegetable-derived colorant.

In addition, in the ink composition, a content of the colorant other than the vegetable black-derived colorant is not particularly limited, and for example, the content described above with respect to the total mass of the ink composition is 0 to 10 percent by mass, preferably 0 to 8.0 percent by mass, more preferably 0.1 to 7.0 percent by mass, and further preferably 0.3 to 5.0 percent by mass.

1.2. Lignosulfonate Salt

The ink composition of this embodiment contains a lignosulfonate salt. Since the ink composition contains a lignosulfonate salt, the vegetable black-derived colorant is stably dispersed in the ink composition, and hence, the storage stability and the printing stability of the ink composition are improved thereby. Although the reason for this is not clearly understood, the present inventors consider that since the lignosulfonate salt and/or its derivative is likely to trap polyvalent metal ions and to form complexes thereof, the metal components and the lignin molecules contained in the ink are bonded to each other and are then stably covered on the surface of the vegetable black, and as a result, the dispersion stability can be further improved, and the storage stability can also be improved. Accordingly, the lignosulfonate salt is considered to form a complex with the element A in the ink composition.

In addition, the lignosulfonate salt is not particularly limited as long as being a lignin or a lignin degradation product having at least one sulfonic group. Although the lignosulfonate salt is not particularly limited, for example, a lignosulfonate alkali metal salt, such as a sodium, a lithium, or a potassium lignosulfonate, or a lignosulfonate ammonium salt may be mentioned. In addition, the lignosulfonate salt may be used alone, or at least two types thereof may be used in combination.

A weight average molecular weight of the lignosulfonate salt is, for example, 1,000 to 80,000. In order to further improve the storage stability and/or the ejection stability of the ink composition, the weight average molecular weight of the lignosulfonate salt is preferably 3,000 to 70,000, more preferably 5,000 to 60,000, even more preferably 10,000 to 50,000, further preferably 15,000 to 40,000, and particularly preferably 20,000 to 35,000.

The lignosulfonate salt or its derivative is not particularly limited, and for example, as a product name, there may be mentioned Pearllex NP, Pearllex DP, or Vanillex N (each manufactured by Nippon Paper Industries Co., Ltd.); 471038-100G (manufactured by Sigma-Aldrich); Newkalgen WG-4 (manufactured by Takemoto Oil & Fat Co., Ltd.); or San X P252 (manufactured by Nippon Paper Industries Co., Ltd.). In order to further improve the effect by the ink composition of the present disclosure, as the lignosulfonate salt, Pearllex NP, Vanillex N, Pearllex DP, 471038-100G, Newkalgen WG-4, or San X P252 is preferable, and Pearllex NP, Vanillex N, Pearllex DP, 471038-100G, or Newkalgen WG-4 is more preferable.

As the lignosulfonate salt or its derivative, a purified compound having a high purity is preferably used. Since a purified lignosulfonate salt having a high purity is used, chelation of the vegetable black is promoted, and hence, the sedimentation resistance and/or the storage stability can be improved.

A ratio (C/B) of a content (C) of the lignosulfonate salt to a content (B) of the vegetable black-derived colorant is not particularly limited and is, for example, 0.2 to 4.2. In order to improve the storage stability and/or the ejection stability of the ink composition, the content ratio (C/B) is preferably 0.3 to 3.5, more preferably 0.5 to 3.0, even more preferably 0.7 to 2.5, and further preferably 1.0 to 2.0.

The content of the lignosulfonate salt is not particularly limited and is, for example, 0.1 to 40 percent by mass with respect to the total mass of the ink composition. In order to further effectively and reliably achieve the effect of the present disclosure, the content of the lignosulfonate salt with respect to the total mass of the ink composition is preferably 0.3 to 35 percent by mass, more preferably 0.5 to 30 percent by mass, even more preferably 1.0 to 25 percent by mass, and further preferably 3.0 to 18 percent by mass.

1.3. Water

The ink composition of this embodiment is a water-based ink composition which contains water. The water-based ink composition is an ink composition which at least contains water as a primary solvent component of the ink.

A content of the water with respect to the total mass of the ink composition is preferably 30 percent by mass or more. In addition, the content of the water is preferably 98 percent by mass or less, more preferably 90 percent by mass or less, even more preferably 40 to 85 percent by mass, and further preferably 50 to 80 percent by mass. Since the content of the water is in the range described above, even when the water is partially evaporated, a viscosity increase of the ink composition is suppressed, and the sedimentation property tends to be suppressed. In addition, since the content of the water is 90 percent by mass or less, curling tends to be further suppressed.

1.4. Water-Soluble Organic Solvent

The ink composition of this embodiment preferably contains a water-soluble organic solvent. Since the ink composition contains a water-soluble organic solvent, the storage stability tends to be further improved. In addition, the water-soluble organic solvent may be used alone, or at least two types thereof may be used in combination.

Although the water-soluble organic solvent is not particularly limited, for example, there may be mentioned glycerin, N-methyl pyrrolidone, ethylene glycol, diethylene glycol, triethylene glycol, propylene glycol, dipropylene glycol, tripropylene glycol, propanediol, butanediol, pentanediol, or hexylene glycol. Among those mentioned above, in view of a moisture retaining effect, glycerin is preferable.

A content of the water-soluble organic solvent is not particularly limited and is, for example, 1.0 to 50 percent by mass with respect to the total mass of the ink composition. In order to further effectively and reliably achieve the effect of the present disclosure, the content of the water-soluble organic solvent with respect to the total mass of the ink composition is preferably 3.0 to 40 percent by mass, more preferably 5.0 to 30 percent by mass, and further preferably 8.0 to 20 percent by mass.

1.5. Saccharide

The ink composition of this embodiment preferably contains a saccharide. A compound to be classified into the saccharide is not particularly limited, and for example, there may be mentioned a monosaccharide, such as a pentose, a hexose, a heptose, or an octose; a polysaccharide, such as a disaccharide, a trisaccharide, or a tetrasaccharide; a saccharide alcohol which is a derivative of one of those mentioned above; a reduced derivative such as a deoxy acid; an oxidized derivative, such as an aldonic acid or an uronic acid; a dehydrated derivative such as glycoseen; an amino acid, or a thiosaccharide. The polysaccharide refers to a saccharide in a broad sense and includes substances, such as a dextrin, a cyclodextrin, and a cellulose, which exist widely in the nature. In order to further effectively and reliably achieve the effect of the present disclosure, as the saccharide contained in the ink composition, a dextrin is preferable. In addition, the saccharide may be used alone, or at least two types thereof may be used in combination.

A content of the saccharide is not particularly limited and is, for example, 0.1 to 10 percent by mass with respect to the total mass of the ink composition. The content of the saccharide with respect to the total mass of the ink composition is preferably 1.0 to 8.0 percent by mass and more preferably 2.0 to 5.0 percent by mass.

1.6. Surface Tension Adjuster

The ink composition of this embodiment preferably contain a surface tension adjuster (hereinafter, "surfactant" is also used in the same meaning). The surface tension adjuster is not particularly limited, and for example, an acetylene glycol-based surfactant, a fluorine-based surfactant, or a silicone-based surfactant may be mentioned. Among those mentioned above, in view of the storage stability of the ink composition, an acetylene glycol-based surfactant is preferable. In addition, the surface tension adjuster may be used alone, or at least two types thereof may be used in combination.

The acetylene glycol-based surfactant is not particularly limited, and for example, at least one selected from 2,4,7,9-tetramethyl-5-decyne-4,7-diol, an alkylene oxide adduct thereof, 2,4-dimethyl-5-decyne-4-ol, and an alkylene oxide adduct thereof is preferable. Although a commercially available product of the acetylene glycol-based surfactant is not particularly limited, for example, there may be mentioned Olfine 104 Sereis or E Series such as Olfine E1010 (trade name, manufactured by Air Products & Chemicals Inc.) or Surfynol 61, 104, or 465 (trade name, manufactured by Nisshin Chemical Industry Co., Ltd.). Among those mentioned above, in order to more effectively and reliably achieve the effect of the present disclosure, Olfine E1010 is preferably contained as the surface tension adjuster.

A content of the surface tension adjuster is not particularly limited and is, for example, 0.1 to 5.0 percent by mass with respect to the total mass of the ink composition. The content of the surface tension adjuster with respect to the total mass of the ink composition is preferably 0.2 to 3.0 percent by mass and more preferably 0.3 to 1.0 percent by mass.

1.7. Chelating Agent

The ink composition of this embodiment preferably contains a chelating agent. Since the ink composition contains a chelating agent, the storage stability tends to be made excellent. The chelating agent is not particularly limited, and for example, there may be mentioned an ethylenediaminetetraacetic acid salt, an edetate disalt, a pyrophosphate salt, a hexametaphosphate salt, citric acid, tartaric acid, or gluconic acid. In order to further effectively and reliably achieve the effect of the present disclosure, an ethylenediaminetetraacetic acid salt is preferable as the chelating agent. In addition, the chelating agent may be used alone, or at least two types thereof may be used in combination.

A content of the chelating agent is not particularly limited and is, for example, 0.01 to 10.0 percent by mass with respect to the total mass of the ink composition. In order to further effectively and reliably improve the storage stability and/or the ejection stability of the ink composition, the content of the chelating agent with respect to the total mass of the ink composition is preferably 0.01 to 7.0 percent by mass, more preferably 0.05 to 5.0 percent by mass, and further preferably 0.1 to 2.0 percent by mass.

1.8. Method for Manufacturing Ink Jet Ink Composition

A method for manufacturing the ink jet ink composition of this embodiment is not particularly limited, and there may be mentioned a method in which after a vegetable black-derived colorant, a lignosulfonate salt, and an element A which includes at least one selected from the group consisting of Ca, Mg, Mn, Fe, Al, Si, Cr, Ni, Sr, and Ba are prepared so that a content of the element A with respect to the total mass of the ink composition is 50 to 1,700 mass ppm, the components described above are mixed with each other. In addition, as the vegetable black-derived colorant and the lignosulfonate salt, either purified or unpurified materials may be used.

2. Ink Jet Recording Method

An ink jet method according to this embodiment includes an ejection step of ejecting the ink jet ink composition described above using a predetermined ink jet head so as to be adhered to a recording medium and a transport step of transporting the recording medium. In addition, the ejection step and the transport step may be simultaneously or alternately performed.

2.1. Ejection Step

In the ejection step, the ink is ejected from an ink jet head and is then adhered to the recording medium. In more particular, a pressure generating device provided in the ink jet head is driven, and the ink filled in a pressure generating chamber in the ink jet head is ejected from a nozzle. The ejection method as described above is also called an ink jet method.

As the ink jet head used in the ejection step, a line head to perform recording by a line method and a serial head to perform recording by a serial method are mentioned.

In the line method using a line head, for example, an ink jet head having a width equal to or larger than a recording width of a recording medium is fixed in a recording apparatus. Subsequently, the recording medium is transferred in a sub-scanning direction (transport direction of the recording medium), and in conjunction with this transfer, ink droplets are ejected from the nozzle of the ink jet head, so that an image is recorded on the recording medium.

In the serial method using a serial head, for example, an ink jet head is mounted on a carriage movable in a width direction of a recording medium. Subsequently, the carriage is transferred along a main scanning direction (width direction of the recording medium), and in conjunction with this transfer, ink droplets are ejected from the nozzle of the ink jet head, so that an image is recorded on the recording medium.

2.2. Transport Step

The transport step transports the recording medium in a predetermined direction in the recording apparatus. In more particular, using a transport roller and/or a transport belt provided in the recording apparatus, the recording medium is transported from a paper feed portion to a paper discharge portion in the recording apparatus. In this transport step, the ink ejected from the ink jet head is adhered to the recording medium, so that a recorded matter is formed. The transport may be performed continuously or intermittently.

2.3. Recording Medium

A recording medium used in this embodiment is not particularly limited, and for example, an absorbing or a non-absorbing recording medium may be mentioned.

Although the absorbing recording medium is not particularly limited, as examples thereof, there may be mentioned regular paper, such as electrophotographic paper, having a high ink permeability; ink jet paper (ink jet exclusive paper which includes an ink absorbing layer formed from silica particles or alumina particles or an ink absorbing layer formed from a hydrophilic polymer, such as a poly(vinyl alcohol) (PVA) or a poly(vinyl pyrrolidone) (PVP)); and art paper, coated paper, or cast paper which has a relatively low ink permeability and which is used for general offset printing.

Although the non-absorbing recording medium is not particularly limited, for example, there may be mentioned a film or a plate of a plastic, such as a poly(vinyl chloride), a polyethylene, a polypropylene, a poly(ethylene terephthalate) (PET), a polycarbonate, a polystyrene, or a polyurethane; a plate of a metal, such as iron, silver, copper, or aluminum; a metal plate or a plastic-made film formed by deposition of at least one of the various types of metals mentioned above; a plate of an alloy, such as stainless steel or brass; or a recording medium in which a film of a plastic, such as a poly(vinyl chloride), a polyethylene, a polypropylene, a poly(ethylene terephthalate) (PET), a polycarbonate, a polystyrene, or a polyurethane, is adhered (coated) on a paper-made substrate.

3. Recording Apparatus

A recording apparatus of this embodiment includes an ink jet head having at least one nozzle to eject an ink jet ink composition to a recording medium and a transport device to transport the recording medium. The ink jet head includes a pressure chamber to which the ink is supplied and the nozzle to eject the ink. In addition, the transport device is formed from a transport roller and/or a transport belt provided in the recording apparatus.

Hereinafter, the recording apparatus according to this embodiment will be described with reference to FIGURE. In addition, in the X-Y-Z coordinate system shown in FIGURE, an X direction indicates a length direction of the recording medium, a Y direction indicates a width direction of the recording medium in a transport path in the recording apparatus, and a Z direction indicates a height direction of the apparatus.

As one example of a recording apparatus 10, a line type ink jet printer capable of performing printing at a high speed and at a high density will be described. The recording apparatus 10 includes a feed portion 12 to store a recording medium P such as paper, a transport portion 14, a belt transport portion 16, a record portion 18, an Fd (facedown) discharge portion 20 functioning as a "discharge portion", an Fd (facedown) stage 22 functioning as a "stage", a reverse path portion 24 functioning as a "reverse transport mechanism", an Fu (faceup) discharge portion 26, and an Fu (faceup) stage 28.

The feed portion 12 is disposed at a lower side of the recording apparatus 10. The feed portion 12 includes a feed tray 30 to store the recording medium P and a feed roller 32 to feed the recording medium P stored in the feed tray 30 to a transport path 11.

The recording medium P stored in the feed tray 30 is fed to the transport portion 14 along the transport path 11 by the feed roller 32. The transport portion 14 includes a transport drive roller 34 and a transport driven roller 36. The transport drive roller 34 is rotationally driven by a driving source not shown. In the transport portion 14, the recording medium P is nipped between the transport drive roller 34 and the transport driven roller 36 and is then transported to the belt transport portion 16 located downstream of the transport path 11.

The belt transport portion 16 includes a first roller 38 located upstream of the transport path 11, a second roller 40 located downstream thereof, an endless belt 42 fitted to the first roller 38 and the second roller 40 in a rotationally transferable manner, and a support body 44 to support an upper-side section 42a of the endless belt 42 between the first roller 38 and the second roller 40.

The endless belt 42 is driven by the first roller 38 driven by the driving source not shown or the second roller 40 so as to be transferred from a +X direction to a −X direction in the upper-side section 42a. Hence, the recording medium P transported from the transport portion 14 is further transported downstream of the transport path 11 in the belt transport portion 16.

The record portion 18 includes a line type ink jet head 48 and a head holder 46 to hold the ink jet head 48. In addition, the record portion 18 may also be a serial type in which an ink jet head is mounted on a carriage which is reciprocally transferred in a Y axis direction. The ink jet head 48 is disposed so as to face the upper-side section 42a of the endless belt 42 supported by the support body 44. When the recording medium P is transported in the upper-side section 42a of the endless belt 42, the ink jet head 48 ejects the ink to the recording medium P, so that the recording is carried out. While the recording is carried out, the recording medium P is transported downstream of the transport path 11 by the belt transport portion 16.

In addition, the "line type ink jet head" is a head used for the recording apparatus in which a nozzle region formed in a direction intersecting the transport direction of the recording medium P is provided so as to cover the entire recording medium P in the intersecting direction, and while one of the head and the recording medium P is fixed, the other is transferred to form an image. In addition, the nozzle region of the line head in the intersecting direction may not cover the entire recording medium P in the intersecting direction in the recording apparatus.

In addition, a first branch portion 50 is provided downstream of the transport path 11 of the belt transport portion 16. The first branch portion 50 is configured to switchably communicate with one of the transport path 11 to transport the recording medium P to the Fd discharge portion 20 or the Fu discharge portion 26 and a reverse path 52 of the reverse path portion 24 in which after a recording surface of the recording medium P is reversed, the recording medium P is again transported to the record portion 18. In addition, the recording medium P to be transported after the transport path 11 is switched to the reverse path 52 by the first branch portion 50 is processed such that the recording surface thereof is reversed in a transport process in the reverse path 52 and is again transported to the record portion 18 so that a surface of the recording medium P opposite to the original recording surface faces the ink jet head 48.

In addition, a second branch portion 54 is further provided downstream of the first branch portion 50 along the transport path 11. The second branch portion 54 is configured so as to transport the recording medium P to one of the Fd discharge portion 20 and the Fu discharge portion 26 by switching the transport direction of the recording medium P.

The recording medium P transported to the Fd discharge portion 20 by the second branch portion 54 is discharged from the Fd discharge portion 20 and then placed on the Fd stage 22. In this case, the recording surface of the recording medium P is placed so as to face the Fd stage 22. In addition, the recording medium P transported to the Fu discharge portion 26 by the second branch portion 54 is discharged from the Fu discharge portion 26 and then placed on the Fu stage 28. In this case, the recording surface of the recording medium P is placed so as to face a side opposite to the Fu stage 28.

In addition, although the case in which the line type ink jet head is used has been described above by way of example, the recording apparatus of this embodiment may be a printer (serial printer) using a serial type ink jet head. In the serial printer, while a recording medium is transported in a transport direction, the ink jet head is transferred in a direction intersecting the transport direction described above, so that the printing is performed.

4. Recorded Matter

A recorded matter of this embodiment is obtained by adhering the ink composition described above to a recording medium. The ink composition described above has preferable sedimentation resistance and storage stability, and as a result, since the ink composition also has an excellent ejection stability, a recorded matter can be stably obtained even when repetitive recording is performed.

EXAMPLES

Hereinafter, the present disclosure will be described in more detail with reference to Examples and Comparative Examples. However, the present disclosure is not limited at all to the following Examples.

1. Preparation of Ink Composition

After components were charged in a mixing tank so as to have one of the compositions shown in Tables 1 to 5 and were then mixed and stirred, filtration was further performed using a membrane filter, so that the ink jet ink composition of each example was obtained. In addition, a vegetable black purified by the method described above was used. In addition, unless otherwise particularly noted, the numerical value of each component of each example in the table represents percent by mass. In addition, in the table, the numerical value of the vegetable black represents percent by mass of a solid content.

The abbreviations and the details of product components shown in Tables 1 to 5 are as described below. In addition, "highly purified" indicates a purified compound.

Colorant (Vegetable Black)
 Binchotan charcoal (manufactured by Kiriya Chemical Co., Ltd.)
 Bamboo charcoal (manufactured by Kiriya Chemical Co., Ltd.)

Highly Purified Sodium Lignosulfonate
 L1 (Mw: 30,000, Pearllex NP, manufactured by Nippon Paper Industries Co., Ltd.)
 L2 (Mw: 9,800, Vanillex N, manufactured by Nippon Paper Industries Co., Ltd.)
 L3 (Mw: 15,000, Pearllex DP, manufactured by Nippon Paper Industries Co., Ltd.)
 L4 (Mw: 50,000, 471038-100G, manufactured by Sigma-Aldrich)
 L5 (Mw: 70,000, Newkalgen WG-4, manufactured by Takemoto Oil & Fat Co., Ltd.)

Unpurified Sodium Lignosulfonate
 L6 (Mw: 30,000, San X P252, manufactured by Nippon Paper Industries Co., Ltd.)

Other Dispersant
 Glycerin fatty acid ester (Decaglyn 1-L, manufactured by Nikko Chemicals Co., Ltd.)

Solvent (Water-Soluble Organic Solvent)
 Glycerin (commercially available product)

Saccharide
 Dextrin (α-cyclodextrin) (manufactured by FUJI FILM Wako Pure Chemical Corporation)

Surface Tension Adjuster
 Olfine E1010 (manufactured by Nisshin Chemical Industry Co., Ltd.)

Chelating Agent
 EDTA (ethylenediaminetetraacetic acid)

2. Measurement Method 2.1. Measurement of Particle Diameter in Ink

An average particle diameter in the ink was measured by a particle size distribution measurement device (ELSZ-1000, manufactured by Otsuka Electronics Co., Ltd.). A D50 diameter based on a scattering intensity distribution standard is shown in Tables 1 to 5 as "D50 particle diameter". In addition, the average particle diameter in the ink is assumed to be obtained from the vegetable black-derived colorant particles and is regarded as same as the average particle diameter of the vegetable black-derived colorant.

2.2. Mass Analysis of Metal Component

A mass analysis of each metal component in the ink was measured by an ICP-OES (G8015AA, manufactured by Agilent Technologies Japan, Ltd.).

3. Evaluation Method 3.1. Storage Stability

The ink was received in a glass-made air-tight container and was then left at 50° C. for 3 days. The ink thus left was recovered, and a viscosity thereof at a shear rate of 200 $[S^{-1}]$ was measured by a rheometer (MCR-306, manufactured by Anton Paar).

Evaluation Criteria
 AA: Rate of change is less than 10%.
 A: Rate of change is 10% to less than 20%.
 B: Rate of change is 20% to less than 30%.
 C: Rate of change is 30% or more.

2.2. Ejection Stability

After each of the ink compositions shown in Tables 1 to 5 was filled in an ink cartridge of a modified recording apparatus (PX-5840, manufactured by Seiko Epson corporation), a solid pattern was printed in a A4 size recording region at a resolution of 1,440 dpi in lateral×720 dpi in vertical and at a duty of 100%. After printing was continuously performed on 50 sheets, the number of missing nozzles was counted.

In addition, in this specification, the "duty" is the value calculated by the following equation.

Duty (%)=actual number of printing dots/(vertical resolution×lateral resolution)×100

In the equation, "actual number of printing dots" represents the actual number of printing dots per unit area, and "vertical resolution" and "lateral resolution" each represent a resolution per unit area. In addition, "Duty 100%" means the maximum ink weight of single color per unit pixel.

Evaluation Criteria
 AA: Number of missing nozzles is less than 5.
 A: Number of missing nozzles is 5 to less than 10.
 B: Number of missing nozzles is 10 to less than 20.
 C: Number of missing nozzles is 20 or more.

2.3. Sedimentation Rate

The ink composition was charged in a centrifuge tube so that a total mass of the centrifuge tube, a lid thereof, and the water-based ink jet ink composition was 55 g, and the tube was closed by the lid. After the centrifuge tube provided with the lid was set in a centrifugal machine (model "CR-20B2", ROTOR No. 36, manufactured by Hitachi Koki Co., Ltd.), a treatment was performed at a rate of 10,000 rpm for 15 minutes, and a supernatant solution (region of 5 g from a gas-liquid interface) was collected. Subsequently, the absorbance of the supernatant solution thus obtained and the absorbance of the water-based ink jet ink composition before the centrifugal treatment were measured using light having a wavelength of 500 nm. A ratio of the absorbance ($C1$) of the supernatant solution to the absorbance ($C0$) of the water-based ink jet ink composition was calculated by the following equation, and a sedimentation rate ($P1$) was evaluated in accordance with the following evaluation criteria.

$$P1(\%)=(C1/C0)\times100$$

Evaluation Criteria
 AA: 90% or more
 A: 80% to less than 90%
 B: 70% to less than 80%
 C: less than 70%

TABLE 1

| | | EXAMPLE | | | | | | |
|---|---|---|---|---|---|---|---|---|
| | | 1 | 2 | 3 | 4 | 5 | 6 | 7 |
| VEGETABLE BLACK | BINCHOTAN CHARCOAL | 6 | 6 | 6 | | | | 6 |
| | BAMBOO CHARCOAL | | | | 6 | 6 | 6 | |
| HIGHLY PURIFIED SODIUM LIGNOSULFONATE | L1 (Mw: 30000) | 9 | 9 | 9 | 9 | 9 | 9 | |
| | L2 (Mw: 9800) | | | | | | | |
| | L3 (Mw: 15000) | | | | | | | |
| | L4 (Mw: 50000) | | | | | | | |
| | L5 (Mw: 70000) | | | | | | | |
| UNPURIFIED SODIUM LIGNOSULFONATE | L6 (Mw: 30000) | | | | | | | 9 |
| METAL | Ca | 600 | 400 | 30 | 500 | 250 | 50 | 400 |
| | Mg | 450 | 200 | 30 | 300 | 250 | 50 | 200 |
| | Mn | 100 | 50 | 10 | 30 | 15 | 10 | 50 |
| | Fe | 50 | 50 | 10 | 100 | 50 | 30 | 50 |
| | Al | 30 | 10 | | 30 | 15 | | 10 |
| | Si | 30 | 10 | | 200 | 100 | | 10 |
| | Cr | 10 | 15 | | 200 | 10 | | 15 |
| | Ni | 10 | 5 | | 20 | 10 | | 5 |
| | Sr | 10 | | | 10 | 5 | | |
| | Ba | 10 | | | 10 | 5 | | |
| WATER-SOLUBLE ORGANIC SOLVENT | GLYCERIN | 10 | 10 | 10 | 10 | 10 | 10 | 10 |
| SACCHARIDE | DEXTRIN | 3 | 3 | 3 | 3 | 3 | 3 | 3 |
| SURFACE TENSION ADJUSTER | OLFINE E1010 | 0.5 | 0.5 | 0.5 | 0.5 | 0.5 | 0.5 | 0.5 |
| CHELATING AGENT | EDTA | 0.1 | 0.1 | 0.1 | 0.1 | 0.1 | 0.1 | 0.1 |
| WATER | | BALANCE | BALANCE | BALANCE | BALANCE | BALANCE | BALANCE | BALANCE |
| TOTAL | | 100 | 100 | 100 | 100 | 100 | 100 | 100 |
| TOTAL OF METALS | | 1300 | 740 | 80 | 1400 | 710 | 140 | 740 |
| Ca, Mg, Sr, Ba | ALKALINE EARTH METAL | 1070 | 600 | 60 | 820 | 510 | 100 | 600 |
| Fe, Cr, Ni | TRANSITION ELEMENT | 70 | 70 | 10 | 320 | 70 | 30 | 70 |

TABLE 1-continued

|  |  | EXAMPLE | | | | | | |
| --- | --- | --- | --- | --- | --- | --- | --- | --- |
|  |  | 1 | 2 | 3 | 4 | 5 | 6 | 7 |
| Al, Si | TYPICAL ELEMENT | 60 | 20 | 0 | 230 | 115 | 0 | 20 |
| D50 PARTICLE DIAMETER (nm) |  | 150 | 150 | 150 | 150 | 150 | 150 | 250 |
| D90 PARTICLE DIAMETER (nm) |  | 200 | 200 | 230 | 200 | 200 | 200 | 500 |
| MOLECULAR WEIGHT OF SODIUM LIGNOSULFONATE (Mw) |  | 30000 | 30000 | 30000 | 30000 | 30000 | 30000 | 30000 |
| MASS RATIO OF LIGNOSULFONATE SALT/VEGETABLE BLACK |  | 1.50 | 1.50 | 1.50 | 1.50 | 1.50 | 1.50 | 1.50 |
| EVALUATION ITEM | STORAGE STABILITY | AA | AA | A | AA | AA | AA | B |
|  | PRINTING STABILITY | AA | AA | AA | AA | AA | AA | B |
|  | SEDIMENTATION RATE | AA | AA | AA | AA | AA | AA | B |

TABLE 2

|  |  | EXAMPLE | | | | | |
| --- | --- | --- | --- | --- | --- | --- | --- |
|  |  | 8 | 9 | 10 | 11 | 12 | 13 |
| VEGETABLE BLACK | BINCHOTAN CHARCOAL | 6 | 6 | 6 | 6 | 6 | 6 |
|  | BAMBOO CHARCOAL |  |  |  |  |  |  |
| HIGHLY PURIFIED SODIUM LIGNOSULFONATE | L1 (Mw: 30000) | 9 | 9 | 9 | 9 | 9 | 9 |
|  | L2 (Mw: 9800) |  |  |  |  |  |  |
|  | L3 (Mw: 15000) |  |  |  |  |  |  |
|  | L4 (Mw: 50000) |  |  |  |  |  |  |
|  | L5 (Mw: 70000) |  |  |  |  |  |  |
| UNPURIFIED SODIUM LIGNOSULFONATE | L6 (Mw: 30000) |  |  |  |  |  |  |
| METAL | Ca | 750 | 50 | 400 | 400 | 100 | 400 |
|  | Mg | 750 | 50 | 200 | 200 | 100 | 200 |
|  | Mn | 50 | 50 | 10 | 10 | 10 | 10 |
|  | Fe | 30 | 50 | 300 | 10 | 50 | 20 |
|  | Al | 10 | 50 | 10 | 10 | 50 | 15 |
|  | Si | 10 | 50 | 10 | 10 | 50 | 15 |
|  | Cr | 10 | 50 | 100 |  | 10 |  |
|  | Ni | 10 |  | 100 |  | 10 |  |
|  | Sr |  |  |  |  |  |  |
|  | Ba |  |  |  |  |  |  |
| WATER-SOLUBLE ORGANIC SOLVENT | GLYCERIN | 10 | 10 | 10 | 10 | 10 | 10 |
| SACCHARIDE | DEXTRIN | 3 | 3 | 3 | 3 | 3 | 3 |
| SURFACE TENSION ADJUSTER | OLFINE E1010 | 0.5 | 0.5 | 0.5 | 0.5 | 0.5 | 0.5 |
| CHELATING AGENT | EDTA | 0.1 | 0.1 | 0.1 | 0.1 | 0.1 | 0.1 |
| WATER |  | BALANCE | BALANCE | BALANCE | BALANCE | BALANCE | BALANCE |
| TOTAL |  | 100 | 100 | 100 | 100 | 100 | 100 |
| TOTAL OF METALS |  | 1620 | 350 | 1130 | 640 | 380 | 660 |
| Ca, Mg, Sr, Ba | ALKALINE EARTH METAL | 1500 | 100 | 600 | 600 | 200 | 600 |
| Fe, Cr, Ni | TRANSITION ELEMENT | 50 | 100 | 500 | 10 | 70 | 20 |
| Al, Si | TYPICAL ELEMENT | 20 | 100 | 20 | 20 | 100 | 30 |
| D50 PARTICLE DIAMETER (nm) |  | 150 | 150 | 150 | 150 | 150 | 150 |
| D90 PARTICLE DIAMETER (nm) |  | 250 | 250 | 250 | 250 | 250 | 250 |
| MOLECULAR WEIGHT OF SODIUM LIGNOSULFONATE (Mw) |  | 30000 | 30000 | 30000 | 30000 | 30000 | 30000 |
| MASS RATIO OF LIGNOSULFONATE SALT/VEGETABLE BLACK |  | 1.50 | 1.50 | 1.50 | 1.50 | 1.50 | 1.50 |
| EVALUATION ITEM | STORAGE STABILITY | A | A | A | A | A | A |
|  | PRINTING STABILITY | A | A | A | A | A | A |
|  | SEDIMENTATION RATE | AA | AA | AA | AA | AA | AA |

TABLE 3

|  |  | EXAMPLE | | | | | | | |
| --- | --- | --- | --- | --- | --- | --- | --- | --- | --- |
|  |  | 14 | 15 | 16 | 17 | 18 | 19 | 20 | 21 |
| VEGETABLE BLACK | BINCHOTAN CHARCOAL | 6 | 6 | 6 | 6 | 6 | 6 | 6 | 6 |
|  | BAMBOO CHARCOAL | | | | | | | | |
| HIGHLY PURIFIED SODIUM LIGNOSULFONATE | L1 (Mw: 30000) | 9 | 9 | 9 | 9 | | | | |
|  | L2 (Mw: 9800) | | | | | 9 | | | |
|  | L3 (Mw: 15000) | | | | | | 9 | | |
|  | L4 (Mw: 50000 | | | | | | | 9 | |
|  | L5 (Mw: 70000) | | | | | | | | 9 |
| UNPURIFIED SODIUM LIGNOSULFONATE | L6 (Mw: 30000) | | | | | | | | |
| METAL | Ca | 400 | 400 | 400 | 400 | 400 | 400 | 400 | 400 |
|  | Mg | 200 | 200 | 200 | 200 | 200 | 200 | 200 | 200 |
|  | Mn | 50 | 50 | 50 | 50 | 50 | 50 | 50 | 50 |
|  | Fe | 50 | 50 | 50 | 50 | 50 | 50 | 50 | 50 |
|  | Al | 10 | 10 | 10 | 10 | 15 | 15 | 15 | 15 |
|  | Si | 10 | 10 | 10 | 10 | 15 | 15 | 15 | 15 |
|  | Cr | 15 | 15 | 15 | 15 | 5 | 5 | 5 | 5 |
|  | Ni | 5 | 5 | 5 | 5 | | | | |
|  | Sr | | | | | | | | |
|  | Ba | | | | | | | | |
| WATER-SOLUBLE ORGANIC SOLVENT | GLYCERIN | 10 | 10 | 10 | 10 | 10 | 10 | 10 | 10 |
| SACCHARIDE | DEXTRIN | 3 | 3 | 3 | 3 | 3 | 3 | 3 | 3 |
| SURFACE TENSION ADJUSTER | OLFINE E1010 | 0.5 | 0.5 | 0.5 | 0.5 | 0.5 | 0.5 | 0.5 | 0.5 |
| CHELATING AGENT | EDTA | 0.1 | 0.1 | 0.1 | 0.1 | 0.1 | 0.1 | 0.1 | 0.1 |
| WATER | | BALANCE | BALANCE | BALANCE | BALANCE | BALANCE | BALANCE | BALANCE | BALANCE |
| TOTAL | | 100 | 100 | 100 | 100 | 100 | 100 | 100 | 100 |
| TOTAL OF METALS | | 740 | 740 | 740 | 740 | 735 | 735 | 735 | 735 |
| Ca, Mg, Sr, Ba | ALKALINE EARTH METAL | 600 | 600 | 600 | 600 | 600 | 600 | 600 | 600 |
| Fe, Cr, Ni | TRANSITION ELEMENT | 70 | 70 | 70 | 70 | 55 | 55 | 55 | 55 |
| Al, Si | TYPICAL ELEMENT | 20 | 20 | 20 | 20 | 30 | 30 | 30 | 30 |
| D50 PARTICLE DIAMETER (nm) | | 50 | 80 | 400 | 450 | 150 | 150 | 150 | 150 |
| D90 PARTICLE DIAMETER (nm) | | 90 | 120 | 700 | 800 | 350 | 200 | 200 | 350 |
| MOLECULAR WEIGHT OF SODIUM LIGNOSULFONATE (Mw) | | 30000 | 30000 | 30000 | 30000 | 9800 | 15000 | 50000 | 70000 |
| MASS RATIO OF LIGNOSULFONATE SALT/VEGETABLE BLACK | | 1.50 | 1.50 | 1.50 | 1.50 | 1.50 | 1.50 | 1.50 | 1.50 |
| EVALUATION ITEM | STORAGE STABILITY | B | AA | A | A | B | AA | AA | B |
|  | PRINTING STABILITY | A | AA | A | B | A | AA | AA | A |
|  | SEDIMENTATION RATE | A | AA | A | B | A | AA | AA | A |

|  |  | EXAMPLE | | | | | | |
| --- | --- | --- | --- | --- | --- | --- | --- | --- |
|  |  | 22 | 23 | 24 | 25 | 26 | 27 | 28 |
| VEGETABLE BLACK | BINCHOTAN CHARCOAL | 6 | 6 | 6 | 6 | 6 | 6 | 6 |
|  | BAMBOO CHARCOAL | | | | | | | |

|  |  | EXAMPLE | | | | | | |
| --- | --- | --- | --- | --- | --- | --- | --- | --- |
|  |  | 22 | 23 | 24 | 25 | 26 | 27 | 28 |
| HIGHLY PURIFIED SODIUM LIGNOSULFONATE | L1 (Mw: 30000) | 1 | 3 | 18 | 25 | 9 | 9 | 9 |
|  | L2 (Mw: 9800) | | | | | | | |
|  | L3 (Mw: 15000) | | | | | | | |
|  | L4 (Mw: 50000) | | | | | | | |
|  | L5 (Mw: 70000) | | | | | | | |
| UNPURIFIED SODIUM LIGNOSULFONATE | L6 (Mw: 30000) | | | | | | | |
| METAL | Ca | 400 | 400 | 400 | 400 | 400 | 400 | 400 |
|  | Mg | 200 | 200 | 200 | 200 | 200 | 200 | 200 |
|  | Mn | 50 | 50 | 50 | 50 | 50 | 50 | 50 |
|  | Fe | 50 | 50 | 50 | 50 | 50 | 50 | 50 |
|  | Al | 15 | 15 | 15 | 15 | 15 | 15 | 15 |
|  | Si | 15 | 15 | 15 | 15 | 15 | 15 | 15 |
|  | Cr | 5 | 5 | 5 | 5 | 5 | 5 | 5 |
|  | Ni | | | | | | | |
|  | Sr | | | | | | | |
|  | Ba | | | | | | | |
| WATER-SOLUBLE ORGANIC SOLVENT | GLYCERIN | 10 | 10 | 10 | 10 | 10 | 10 | 10 |
| SACCHARIDE | DEXTRIN | 3 | 3 | 3 | 3 | 3 | 3 | 3 |
| SURFACE TENSION ADJUSTER | OLFINE E1010 | 0.5 | 0.5 | 0.5 | 0.5 | 0.5 | 0.5 | 0.5 |
| CHELATING AGENT | EDTA | 0.1 | 0.1 | 0.1 | 0.1 | 0.5 | 1 | 5 |
| WATER | | BALANCE | BALANCE | BALANCE | BALANCE | BALANCE | BALANCE | BALANCE |
| TOTAL | | 100 | 100 | 100 | 100 | 100 | 100 | 100 |
| TOTAL OF METALS | | 735 | 735 | 735 | 735 | 735 | 735 | 735 |
| Ca, Mg, Sr, Ba | ALKALINE EARTH METAL | 600 | 600 | 600 | 600 | 600 | 600 | 600 |
| Fe, Cr, Ni | TRANSITION ELEMENT | 55 | 55 | 55 | 55 | 55 | 55 | 55 |
| Al, Si | TYPICAL ELEMENT | 30 | 30 | 30 | 30 | 30 | 30 | 30 |
| D50 PARTICLE DIAMETER (nm) | | 150 | 150 | 150 | 150 | 150 | 150 | 150 |
| D90 PARTICLE DIAMETER (nm) | | 350 | 230 | 200 | 300 | 200 | 200 | 300 |
| MOLECULAR WEIGHT OF SODIUM LIGNOSULFONATE (Mw) | | 30000 | 30000 | 30000 | 30000 | 30000 | 30000 | 30000 |
| MASS RATIO OF LIGNOSULFONATE SALT/VEGETABLE BLACK | | 0.17 | 0.50 | 3.00 | 4.17 | 1.50 | 1.50 | 1.50 |
| EVALUATION ITEM | STORAGE STABILITY | B | A | AA | A | AA | AA | A |
|  | PRINTING STABILITY | A | AA | AA | A | AA | AA | A |
|  | SEDIMENTATION RATE | A | AA | AA | A | AA | AA | A |

TABLE 5

|  |  | COMPARATIVE EXAMPLE | | | | REFERENCE EXAMPLE |
| --- | --- | --- | --- | --- | --- | --- |
|  |  | 1 | 2 | 3 | 4 | 1 |
| VEGETABLE BLACK | BINCHOTAN CHARCOAL | 6 | 6 | | 6 | |
|  | BAMBOO CHARCOAL | | | | | |
| CARBON BLACK | CARBON BLACK | | | 6 | | 6 |
| SODIUM LIGNOSULFONATE | L1 (Mw: 30000) | 9 | 9 | 9 | | 9 |
| OTHER DISPERSANT | GLYCERIN FATTY ACID ESTER | | | | 9 | |
| METAL | Ca | 700 | 15 | 450 | 450 | 5 |
|  | Mg | 700 | 10 | 150 | 150 | 5 |
|  | Mn | 100 | 5 | 50 | 50 | 5 |
|  | Fe | 50 | 5 | 50 | 50 | 5 |
|  | Al | 100 | | 10 | 10 | |
|  | Si | 30 | | 10 | 10 | |
|  | Cr | 10 | | 5 | 5 | |

TABLE 5-continued

|  |  | COMPARATIVE EXAMPLE | | | | REFERENCE EXAMPLE |
|---|---|---|---|---|---|---|
|  |  | 1 | 2 | 3 | 4 | 1 |
|  | Ni | 10 |  | 5 | 5 |  |
|  | Sr | 10 |  |  |  |  |
|  | Ba | 10 |  |  |  |  |
| WATER-SOLUBLE ORGANIC SOLVENT | GLYCERIN | 10 | 10 | 10 | 10 | 10 |
| SACCHARIDE | DEXTRIN | 3 | 3 | 3 | 3 | 3 |
| SURFACE TENSION ADJUSTER | OLFINE E1010 | 0.5 | 0.5 | 0.5 | 0.5 | 0.5 |
| CHELATING AGENT | EDTA | 0.1 | 0.1 | 0.1 | 0.1 | 0.1 |
|  | WATER | BALANCE | BALANCE | BALANCE | BALANCE | BALANCE |
|  | TOTAL | 100 | 100 | 100 | 100 | 100 |
|  | TOTAL OF METALS | 1720 | 35 | 730 | 730 | 20 |
| Ca, Mg, Sr, Ba | ALKALINE EARTH METAL | 1420 | 25 | 600 | 600 | 10 |
| Fe, Cr, Ni | TRANSITION ELEMENT | 70 | 5 | 60 | 60 | 5 |
| Al, Si | TYPICAL ELEMENT | 130 | 0 | 20 | 20 | 0 |
|  | D50 PARTICLE DIAMETER (nm) | 150 | 150 | 150 | 150 | 150 |
|  | D90 PARTICLE DIAMETER (nm) | 1500 | 2000 | 1000 | 2000 | 200 |
|  | MOLECULAR WEIGHT OF SODIUM LIGNOSULFONATE (Mw) | 30000 | 30000 | 30000 | 30000 | 30000 |
|  | MASS RATIO OF LIGNOSULFONATE SALT/VEGETABLE BLACK | 1.5 | 1.5 | 1.5 | 0 | 1.5 |
| EVALUATION ITEM | STORAGE STABILITY | C | C | C | C | AA |
|  | PRINTING STABILITY | C | C | C | C | AA |
|  | SEDIMENTATION RATE | B | C | B | C | AA |

3. Evaluation Result

In Tables 1 to 5, the composition of the ink and the evaluation result of each example are shown. As shown in Tables 1 to 4, it is found that since the ink composition of each Example contains the vegetable black-derived colorant, the lignosulfonate salt, and the predetermined amounts of the predetermined metal elements, the sedimentation rate is decreased, and in addition, the ink composition has an excellent storage stability and also has an excellent printing stability.

On the other hand, in Comparative Example 1 in which the amounts of the metal elements are large, it is found that the storage stability and the printing stability are inferior. In Comparative Example 2 in which the amounts of the metal elements are small, it is found that the storage stability, the printing stability, and the sedimentation resistance are inferior. In addition, in Comparative Example 3 in which no vegetable black-derived colorant is used, the storage stability and the printing stability are degraded, and in Comparative Example 4 in which no lignosulfonate salt is used, the storage stability, the printing stability, and the sedimentation resistance are further degraded.

On the other hand, the ink in Reference Example 1 is formed in a manner similar to that of a related pigment ink such that no vegetable black-derived colorant is contained, and the amounts of the metal elements are also controlled to be small. The ink composition of Reference Example 1 thus obtained is excellent all in storage stability, printing stability, and sedimentation resistance. However, the ink in Reference Example 1 uses no natural colorants, and hence, the environmental problems cannot be solved.

What is claimed is:

1. An ink jet ink composition which is a water-based ink jet ink composition, comprising:
   a vegetable black-derived colorant;
   a lignosulfonate salt; and
   an element A which includes at least one selected from the group consisting of Ca, Mg, Mn, Fe, Al, Si, Cr, Ni, Sr, and Ba,
   wherein a content of the element A with respect to a total mass of the ink composition is 50 to 1,700 mass ppm,
   the vegetable black-derived colorant is charcoal being a carbonized colorant that is obtained by treating vegetables under a high-temperature condition, and
   the ink jet ink composition is a black ink.

2. The ink jet ink composition according to claim 1, wherein the lignosulfonate salt forms a complex with the element A.

3. The ink jet ink composition according to claim 1, wherein the vegetable black-derived colorant is dispersed in the ink composition by the lignosulfonate salt.

4. The ink jet ink composition according to claim 1, wherein element A includes Ca, Mg, Sr, and Ba, and a total content of Ca, Mg, Sr, and Ba in the element A with respect to the total mass of the ink composition is 50 to 1,500 mass ppm.

5. The ink jet ink composition according to claim 1, wherein element A includes Fe, Cr and Ni, and a total content of Fe, Cr, and Ni in the element A with respect to the total mass of the ink composition is 10 to 500 mass ppm.

6. The ink jet ink composition according to claim 1, wherein element A includes Al and Si, and a total content of Al and Si in the element A with respect to the total mass of the ink composition is 0 to 250 mass ppm.

7. The ink jet ink composition according to claim 1, wherein the colorant has a volume average particle diameter D50 of 80 to 400 nm at a cumulative value of 50%.

8. The ink jet ink composition according to claim 1, wherein the lignosulfonate salt has a weight average molecular weight of 15,000 to 50,000.

9. The ink jet ink composition according to claim 1, wherein a content ratio (C/B) of a content (C) of the lignosulfonate salt to a content (B) of the vegetable black-derived colorant is 0.5 to 3.0.

10. A recording method comprising:
    ejecting the ink jet ink composition according to claim 1 from an ink jet head to be adhered to a recording medium.

11. A recorded matter obtained by adhering the ink jet ink composition according to claim 1 to a recording medium.

* * * * *